INVENTORS
RONALD W. HUTCHINGS AND
CHARLES HOWARD STRINGHAM

BY
ATTORNEY

United States Patent Office 3,565,636
Patented Feb. 23, 1971

3,565,636
METHOD OF AGGLOMERATING
DEHYDRATED POTATOES
Ronald W. Hutchings, Shelley, Idaho, and Charles H. Stringham, Naples, N.Y., assignors to The R. T. French Company, Rochester, N.Y., a corporation of Delaware
Filed Aug. 23, 1967, Ser. No. 662,684
Int. Cl. A23l 1/12
U.S. Cl. 99—100                                6 Claims

ABSTRACT OF THE DISCLOSURE

In the process of this invention the agglomerated dehydrated potato product is produced by adding water in a steady stream, or in a dropwise fashion, into a travelling bed of potato granules, and by screening off and drying the resultant moist agglomerates. The dry agglomerates have uniform disc shapes if the water is added dropwise. They are in the shape of rods if the water is added as a steady stream. They are friable; and each has a porous structure containing pockets of air, which are the source of the incorporated air which brings about, upon reconstitution, a light, fluffy, white mash with a minimum of stirring.

---

The present invention relates to the preparation of dehydrated potatoes, and more particularly to a process for agglomerating potato granules into a product which will reconstitute as mashed potatoes.

Potato granules, which may be made, for example, in accordance with the process disclosed in U.S. Pat. No. 2,381,838, issued Aug. 7, 1945 to Theodore Rendle, constitute a form of dehydrated mashed potatoes that has been marketed for more than 20 years. The granules are free flowing, need no refrigeration, take up a small amount of space, and can be packaged so that they suffer no flavor degradation for at least one year. They can be easily reconstituted into mashed potatoes by mixing with proper amounts of hot water and milk. Any temperature of liquid above 160° F. is satisfactory for the reconstitution of the granules.

The texture of the reconstituted granules is improved by whipping; and in fact a certain amount of whipping is required in order to produce a white, light-bodied mashed potato. In institutional kitchens, where machine whipping is available and space is at a premium, potato granules are an ideal source of mashed potato. Whipping is however, considered inconvenient by some in a household kitchen where the whipping must be done by hand. Moreover, although it has been found that the need for whipping can be reduced by increasing the porosity of the potato produced in its dehydrated form, but prior methods of increasing this porosity have not been entirely satisfactory.

One object of the present invention is to provide a method of producing an improved dehydrated potato product having some, at least, of the advantages of known potato granules, and in addition having other advantages of its own.

A further object of this invention is to provide an improved process for increasing the porosity of a known dehydrated potato product.

A more specific object of this invention is to provide a method of agglomerating dehydrated potato granules to form therefrom a more porous dehydrated potato product.

Another object of the invention is to provide a new dehydrated potato product which can be reconstituted with only light stirring.

Another object of the invention is to provide an improved potato product, which has a uniform bulk density, and which readily lends itself to volume measure in the kitchen.

Another object of the invention is to provide a new dehydrated potato product in the form of agglomerates, which contain pockets of air, and which can be reconstituted into mashed potatoes with less stirring than prior such products.

Other objects of the invention will be apparent hereinafter from the specification and from the recital of the claims particularly when read in the light of the accompanying drawing.

Figure 1:
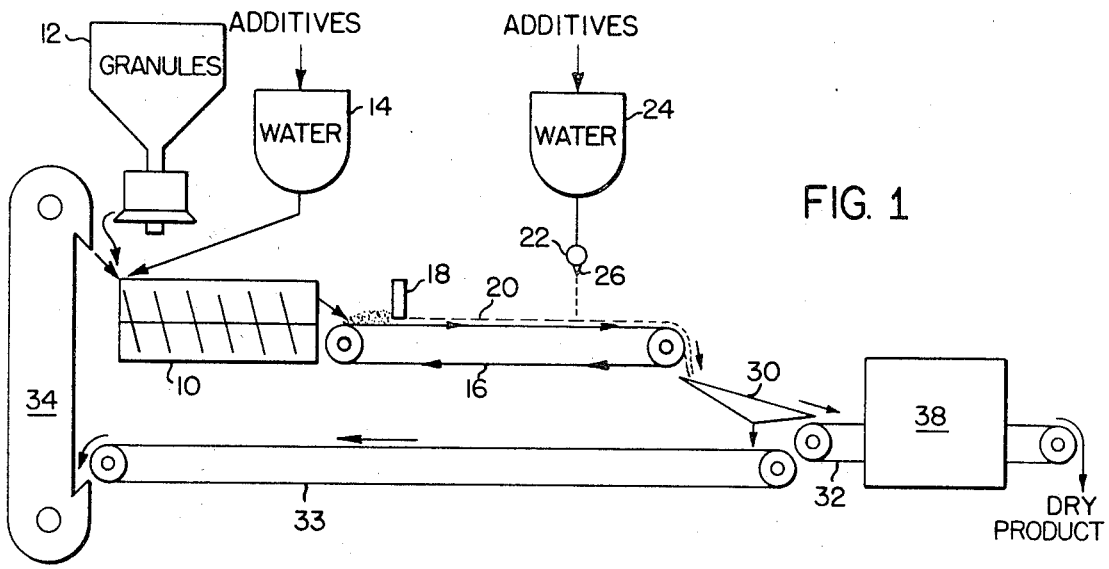
FIG. 1 illustrates diagrammatically the equipment and the successive steps employed in practicing the process of the present invention according to one embodiment thereof.
Figure 2:
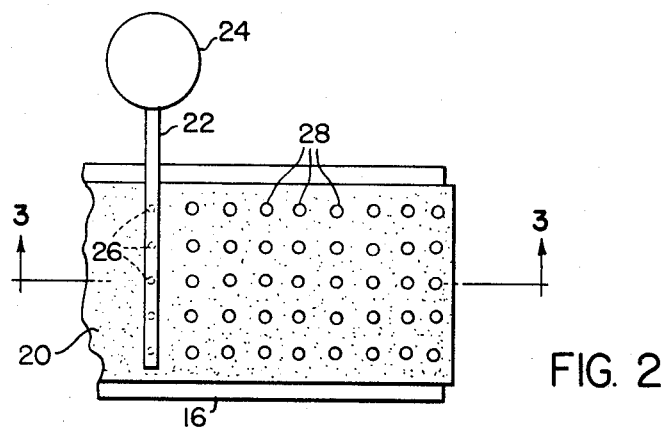
FIG. 2 is an enlarged, fragmentary plan view of that part of the equipment which forms moist agglomerates on a bed of potato granules.
Figure 3:
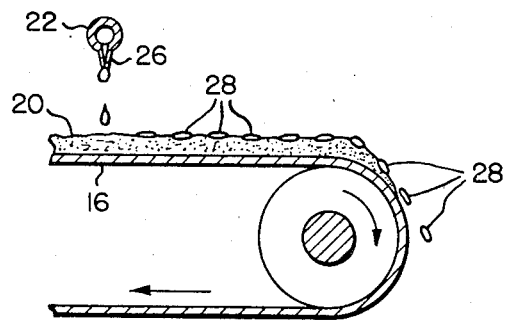
FIG. 3 is a fragmentary cross sectional view taken along the line 3—3 in FIG. 2 looking in the direction of the arrows.

Preparation of agglomerated dehydrated potatoes according to the process of this invention begins with the step of mixing dehydrated potato granules with water or cooked potatoes for the purpose of adjusting the moisture content of the granules. The granules may be fed to a mixer 10 from a conventional hopper or bowl 12; and the water may be supplied from a vessel 14. Other ingredients, such as preservatives, surfactants, flavoring agents, and color, can also be added to mixer 10 from tank 14 during this mixing step.

The mixture is fed from mixer 10 onto a conveyor belt 16, and beneath a plow 18, which spreads it into a uniform layer or bed 20 on the upper run of the conveyor. The band or ribbon of granules is conveyed by the belt beneath a dropping device comprising a pipe 22, which is spaced above and extends transverse to the upper run of belt 16. Pipe 22 is closed at one end, and is connected at its opposite end to a tank 24 containing an agglomerating solution such as water and/or additives of the type noted above. Nozzles or apertures 26 in the bottom of pipe 22 cause droplets of the agglomerating solution to fall upon the travelling bed 20 of potato granules in such a manner that no drop overlaps another drop. Each drop of liquid soaks into the potato granule ribbon and forms a disc-shaped object 28, which although moist and soft, is strong enough to retain its shape through the subsequent processing steps.

About five seconds after a droplet of liquid strikes the bed or ribbon 20 of potato granules, the resultant moist disc 28 has achieved its final shape, and has enough strength to undergo screening. The discs can be screened away any time after that—the sooner the better. Therefore, shortly after the discs 28 are formed in the bed 20, they are dropped off the belt 16 onto a screen 30. The screen 30 is somewhat downwardly inclined and the discs 28 slide off onto a further conveyor belt 32, which carries them to a dryer 38. The fines, or the granules which have not been agglomerated by droplets of liquid, fall onto a return conveyor 33. Conveyor 33 transports the fines (granules) to an elevator 34, which feeds the fines back to mixer 10 for reprocessing.

The wet discs, which are separated from the fines by screen 30, contain from 40 to 60 percent solids. These wet discs are conveyed by belt 32 through the dryer 38, and are dried in any convenient fashion, such as by a current of warm air passing upward through the belt 32 and the discs thereon at a temperature of between 150–250° F.

The bulk density of the final dried product can be in the range of 0.3 to 0.5 gram per cc. The bulk density can be controlled by the size of the droplets used. When water droplets are released from tubing having an internal diameter of 1/16 inch about 560 droplets will weigh 1 ounce. The bulk density of the final product made from droplets this size is about 0.35 gram per cc. When droplets are released from an 18 gauge hypodermic needle, about 1300 droplets weigh 1 ounce, and the product made from droplets this size has a bulk density of 0.37 gram per cc. When a 27 gauge hypodermic needle is used to release the droplets, 4,470 droplets are required to weigh 1 ounce, and the product made from droplets of this size has a bulk density of 0.42 gram per cc. When small drops are used, such as those formed by a 27 gauge hypodermic needle, the product resembles small spheres and does not have the disc shape that is evident when larger droplets are used.

The distance the drop of water falls before striking the bed of wet potato can be from 1/2 to 7 inches. At distances greater than 7 inches the droplets achieve such velocity that they splatter into several smaller drops. The depth of moist potato on the bed into which the water droplets fall should be great enough that the droplet does not wet the belt. We have found that a 3/16 inch deep bed of moist potato granules is satisfactory.

The particle size distribution of the granules used as starting material influences the characteristics of the reconstituted agglomerates. The best size range would be granules which would pass through a 50 mesh screen. Granules larger than 50 mesh yield a grainy-textured product.

The water used for forming the droplets can contain various additives such as preservatives, surfactants, flavor, nutritional additives and color. The temperature of the water used for the droplets can vary over a considerable range. The most desirable temperature is in the vicinity of 110° F. Tap water seems to work as well as distilled water.

The moisture content of the potato granules into which the water falls is very important. When the moisture of these granules is below 12% the resultant dry agglomerates reconstitute very slowly and the mash is lumpy. When the moisture content of these granules is above 28% moisture, it is difficult to separate them from the moist agglomerates. The dry agglomerates formed from these high moisture granules are shapeless and irregular. The range of 12 to 28% moisture granule is most desirable for these reasons.

The following examples show in detail the steps that may be taken to produce the new product. In each of these examples the "starting" dehydrated potato granules were produced by a conventional process such as that disclosed by the above-mentioned Rendle patent.

EXAMPLE I

Four pounds of dehydrated potato granules having a 10 percent moisture content were placed in a 10 quart Hobart bowl, and 1 pound of potatoes, peeled and cooked in known manner, was riced into the potato granules. Four-tenths of a gram of a monoglyceride were added, and the mixture was mixed for five minutes at high speed using a wire whip. This potato mixture, which had a moisture content of 23.7 percent, was spread on a tray about 1/2 inch deep, and droplets of water from tubing of 1/16 inch I.D. were allowed to fall into the potato mixture from a height of 1 inch. The resultant moist discs were screened away from the damp potato granules with a 12 mesh screen, and were placed in a screen bottom tray and dried for about twelve minutes by blowing air at 150° F. upwardly through them. The granules or fines passing through the 12 mesh screen were returned to the tray for the formation of more moist discs.

The bulk density of the dried discs was 0.35 gram per cc. The dried discs were reconstituted in boiling liquid in seconds to give a mash of light, fluffy texture and good flavor.

EXAMPLE II

A quantity of potato granules, which had a 10 percent moisture content, and which had passed through a 50 mesh screen, was divided into three portions. The first portion, called portion A, was processed with its 10 percent moisture content. Water was added to the second portion, portion B, until its moisture content was 15.6 percent; and water was added to the third portion, portion C, until its moisture content was 20.3 percent. Each of these three portions was processed in an identical fashion on continuous equipment as follows:

The granules were spread on a conveyor belt similar, for example, to belt 16, supra, to a depth of 3/16 of an inch, and were passed under a grouping of pipettes, which were used as dropping devices. The pipettes were 7 inches above the bed of potato, and were fed unheated tap water through a siphon system. The pipettes were placed near the end of the belt so that five seconds after a droplet struck the layer of potato granules, the disc-shaped agglomerate formed thereby tumbled over the end of the conveyor onto a screen where it was separated from the background of fine granules. The moist agglomerates were then conveyed from the screen to a dryer, and dried with air at 200° F. for eleven minutes. The moisture content of the dried discs was 6.6 percent. The discs formed from portion A reconstituted in 75 seconds to form a lumpy undesirable mash; the discs from portion B reconstituted in 55 seconds to form an acceptable mash, which contained a few lumps; and the discs from portion C reconstituted in 20 seconds, forming an acceptable sample of mashed potatoes.

If desired, the dropping devices may be constructed to drop water in steady streams onto the bed 20, thus to produce rod-shaped, rather than disc-shaped agglomerates. In either case, the resulting agglomerates, when dried, are porous and contain air pockets which minimize the need for whipping the product, when it is reconstituted into mashed potatoes.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. A process for producing an improved dehydrated potato product, comprising
    dropping liquid onto a bed of moist potato granules to form a plurality of spaced, moist agglomerates in the bed,
    separating the agglomerates from the remainder of the bed, and drying the agglomerates,
    said bed having a moisture content between 12 and 28 percent.

2. A process as claimed in claim 1, wherein the desired moisture content of the potato granules is atttained by mixing dehydrated potato granules with cooked potatoes and then forming the mixture into said bed.

3. A process as claimed in claim 1, wherein water and dehydrated potato granules are mixed to form said bed.

4. A process as claimed in claim 3 wherein preservatives, surfactants, flavoring agents, coloring agents and nutritious additives are included in the water added to said bed.

5. A process for producing an improved dehydrated potato product, comprising
    dropping liquid onto a bed of moist potato granules to form a plurality of spaced, moist agglomerates in the bed, separating the agglomerates from the remainder of the bed, and drying the agglomerates, said liquid being dropped onto the bed in droplets to form discrete flat discs of moist material, said bed being continuously formed from a moist supply of dehydrated potato granules, and being passed in a thin layer beneath the liquid, separation of the agglomerates from said remaining granules being delayed for a predetermined time after the liquid hits the bed to allow the agglomerates to attain their final shapes and give them strength enough for screening, the agglomerates being then screened from the bed, and the remaining granules being returned to said supply after separation from said agglomerates.

6. A process as claimed in claim 5, wherein said layer is approximately three sixteenths of an inch deep.

References Cited

UNITED STATES PATENTS

| 2,627,457 | 2/1953 | Kerley, Jr. | 23—313 |
| 2,856,290 | 10/1958 | Peebles | 99—Agg. Digest |
| 2,980,543 | 4/1961 | Hale et al. | 99—207 |
| 3,077,405 | 2/1963 | Clinton et al. | 99—Agg. Digest |
| 3,207,804 | 9/1965 | Unster et al. | 99—Agg. Digest |
| 1,656,572 | 1/1928 | Schultze | 99—Agg. Digest |
| 3,407,080 | 10/1968 | Rainwater | 99—207 |

WILBUR L. BASCOMB, Jr., Primary Examiner

M. G. MULLEN, Assistant Examiner

U.S. Cl. X.R.

23—313; 99—207